United States Patent [19]

Vogdes et al.

[11] Patent Number: 4,693,940
[45] Date of Patent: Sep. 15, 1987

[54] LAMINATE AND METHOD OF PREPARING SAME

[75] Inventors: Christine E. Vogdes, Albany; Yutaka Kawazoye, Los Altos, both of Calif.

[73] Assignee: Raychem Corporation, Menlo Park, Calif.

[21] Appl. No.: 595,072

[22] Filed: Mar. 30, 1984

Related U.S. Application Data

[63] Continuation-in-part of Ser. No. 466,266, Feb. 14, 1983, abandoned.

[51] Int. Cl.$^4$ .............................................. B32B 27/16
[52] U.S. Cl. ..................................... 428/422; 156/85; 156/229; 156/272.2; 156/273.5; 156/275.5; 156/309.6; 156/309.9; 264/235.6
[58] Field of Search .................... 428/422; 156/84, 85, 156/229, 272.2, 273.5, 275.5, 308.2, 309.6, 309.9; 264/230, 234–235, 235.6

[56] References Cited

U.S. PATENT DOCUMENTS

| 3,188,266 | 6/1965 | Charbonneau et al. | 161/188 |
| 3,435,401 | 3/1969 | Epstein | 338/214 |
| 3,435,407 | 3/1969 | Epstein | 338/214 |
| 3,455,337 | 7/1969 | Cook | 138/178 |
| 3,676,289 | 7/1972 | Hara et al. | 161/189 |
| 3,770,537 | 11/1973 | Elton | 156/244.24 |
| 3,823,217 | 7/1974 | Kampe | 264/105 |
| 3,861,029 | 1/1975 | Smith-Johannsen | 29/611 |
| 3,914,363 | 10/1975 | Bedard | 264/105 |
| 4,252,858 | 2/1981 | Chao et al. | 428/422 |
| 4,294,878 | 10/1981 | Cunningham et al. | 264/235 |
| 4,317,860 | 3/1982 | Strassel | 428/422 |
| 4,334,351 | 6/1982 | Sopory | 29/611 |
| 4,373,554 | 1/1983 | Cook | 138/137 |

FOREIGN PATENT DOCUMENTS

| 1542084 | 10/1968 | France . | |
| 0001718 | 1/1982 | Japan | 156/244.24 |
| 1522397 | 8/1978 | United Kingdom . | |

OTHER PUBLICATIONS

Raychem 1982 Annual Report, p. 12.
"A New Heat-Shrinkable Insulating System" by Edward J. McGowan and John R. Wilson.
"Strength of Adhesive Bonds" and The Role of Chemical Bonding in the Adhesion of Elastomers by A. N. Gent.
European Search Report dated Jul. 4, 1985.

Primary Examiner—Donald E. Czaja
Assistant Examiner—Merrell C. Cashion, Jr.
Attorney, Agent, or Firm—Timothy H. P. Richardson; Herbert G. Burkard

[57] ABSTRACT

In a laminate comprising adjacent layers composed of incompatible polymers, the adhesion between the layers is enhanced by irradiation of the laminate, and can be further enhanced by high temperature annealing of the irradiated laminate.

16 Claims, No Drawings

LAMINATE AND METHOD OF PREPARING SAME

CROSS REFERENCE TO RELATED APPLICATION

This application is a continuation-in-part of our application Ser. No. 466,266, now abandoned, filed Feb. 14, 1983, the entire disclosure of which is incorporated herein by reference.

BACKGROUND OF THE INVENTION

Field of the Invention

This invention relates to laminated polymeric articles.

Introduction to the Invention

In the production of polymeric shaped articles, e.g. heat-shrinkable articles, such as tubing and molded parts, there is almost always a compromise required between desired properties and price, and frequently between different desired properties. For example, products made from polyethylene or similar polymers (e.g. ethylene/vinyl acetate and ethylene/ethyl acrylate copolymers) are of low cost and have good low temperature flexibility, but they have moderate solvent resistance at room temperature and poor solvent resistance at elevated temperature, and are not suitable for use at temperatures above about 135° C. Products based on polar polymers blended with elastomers can show good resistance to polar solvents and good heat aging properties as compared to polyethylene, and are moderately priced. Products comprising mainly fluoropolymers (e.g. blends of Viton with polyvinylidene fluoride) have better solvent resistance and heat aging, and are flexible at room temperature; but they have very poor flexibility at low temperature, e.g. at −55° C., and are very expensive. Polyvinylidene fluoride itself is stiff even at room temperature, as are similar thermoplastic fluoropolymers, but has excellent solvent resistance and heat aging properties. Each of the polymers has high dielectric strength, provided it is sufficiently thick.

Laminates, i.e. multi-layer products, in which one layer provides some desired properties and another layer provides complementary properties, can in principle offer a satisfactory compromise. However, it is not satisfactory merely to have two (or more) layers which are not bonded together, since the layers may move with respect to one another, causing the less flexible material to buckle and crack. Similar materials, e.g polyethylene and ethylene/vinyl acetate copolymers, may be readily melt-bonded, but many pairs of incompatible polymers cannot be bonded together in this way. For example, fluoropolymers, such as polyvinylidene fluoride, which are especially valuable in layered products for their mechanical strength, are notably poor in adhesion to virtually all other polymers. In some cases, the layers can be adhered together with a "tie-layer" of a third polymer to which each has good adhesion, but the use of such tie layers is expensive and inconvenient.

SUMMARY OF THE INVENTION

We have now discovered that it is possible to enhance the bonding between incompatible polymers in a laminate structure by irradiating the laminate, and to further enhance that bonding by heat-treating the irradiated laminate. The technique can be used to produce laminates with a high degree of mechanical integrity even on exposure to solvents or elevated temperatures. The laminates can be in the form of heat-recoverable articles.

In one embodiment, the invention provides a method of preparing a laminate comprising a first layer composed of a first polymeric composition and an adherent second layer composed of a second polymeric composition which is incompatible (as hereinafter defined) with the first polymeric composition, which method comprises (1) preparing a laminate comprising a layer of the first composition and an adjacent layer of the second composition by a process in which the interface between the layers is heated to a temperature which is higher than the melting point of at least one of the polymers in at least one of the compositions; and (2) irradiating the laminate prepared in step (1). Preferably the process includes a further step in which the irradiated laminate is heat-treated, preferably at a temperature which is above the melting point of at least one of the polymers in at least one of the compositions.

DETAILED DESCRIPTION OF THE INVENTION

For the purposes of the present invention, polymeric compositions are regarded as incompatible if a laminate of the two compositions, made by the process described in connection with Example 1 below (without the radiation or heat-treatment steps) has a peel strength of less than 0.9 kg/cm (5 pli), the invention being especially valuable when the peel strength is less than 0.5 kg/cm (3 pli), e.g. less than 0.36 kg/cm (2 pli), particularly less than 0.27 kg/cm (1.5 pli). Peel strengths given in this specification are measured at room temperature by the method described in the Examples.

The excellent results provided by the present invention are believed to result at least in part from chemical cross-linking across the interface between the layers: it is therefore essential that each of the polymeric compositions be radiation cross-linkable. Radiation cross-linking agents are preferably included in the composition to assist in making them radiation cross-linkable and to improve the strength of the bond between the layers. Subject to this limitation, this invention makes it possible to combine the desirable properties (eg. low cost, physical, chemical or electrical properties) of incompatible polymeric compositions, in a way which has hitherto been regarded as quite impossible. Preferably each of the compositions is electrically insulating.

The laminates are particularly useful in the form of heat-recoverable articles, e.g. heat-shrinkable tubes, especially for electrical insulation purposes.

Suitable polymers for use in a layer which is intended to provide good strength, e.g. as the jacket of a tubular article, include fluoropolymers such as polyvinylidene fluoride, polychlorotrifluoroethylene, ethylene/tetrafluoroethylene copolymer, ethylene/chlorotrifluoroethylene copolymer and vinylidene fluoride/hexafluoropropylene copolymer; polyamides such as nylon 11; and high density polyethylene (HDPE). These high modulus polymers can be used alone, or two or more of them can be blended together. If greater flexibility is desired, they can be blended with suitable elastomers or low modulus thermoplastics, e.g. vinylidene fluoride/hexafluoropropylene copolymers, tetrafluoroethylene/propylene copolymers and acrylic resins. Care is needed in selecting such elastomers because they tend to detract considerably from the performance of the high modulus polymer. The amount of such elastomer is typically 5–50%, especially 5–30%, by weight of the composition.

Suitable polymers for use in a layer which is intended to provide good flexibility, and/or to reduce overall cost, e.g. as the inner layer of a tubular product, include elastomers and low modulus polymers, e.g. chlorinated polyethylene, neoprene, block polyester copolymers such as Hytrel (du Pont) and other polyesters, ethylene/vinyl acetate copolymers, ethylene/ethyl acrylate copolymers, ethylene terpolymers such as Vamac (du Pont), and polyamide elastomers, and blends of the above with each other and other elastomers, e.g. fluoroelastomers such as vinylidene fluoride/hexafluoropropylene copolymers.

The polymeric compositions used in the two layers can include additives such as antioxidants, acid acceptors and other stabilizers; colorants; flame retardants (not normally required for fluoropolymers, but often necessary for nylons and polyethylene; inert fillers, e.g. calcium carbonate; plasticizers, e.g. diallyl phthalate (especially if no elastomers are added); processing aids; and compounds which enhance the crosslinking of the polymer on irradiation.

For many applications, it is desirable that polymeric products be resistant to solvents. Immersing laminated articles in a solvent which swells one or both of the layers places a stress on the bond line between them and may result in delamination of layers which have high bond strengths before immersion. As shown by the Examples below, this invention can be used to produce laminates having excellent solvent resistance.

We have found that it is important to use a sufficiently high temperature in the formation of the laminate. Preferably the interface is heated to a temperature which is higher than the melting point of at least one of the polymers in each of the compositions. Coextrusion of the two compositions is a preferred method of preparing the laminates.

The conditions in the radiation and heat-treatment steps should be selected to obtain a suitable increase, preferably at least a two-fold increase, in the peel strength of the laminate. Radiation dosages in the range 2.0 to 15.0 Mrads are usually satisfactory, e.g. 5 to 10.0 Mrads, depending on the polymeric composition and any radiation cross-linking agent therein. Radiation at room temperature is preferred.

We have found that heat-treatment of the irradiated laminate results in substantial increases in bond strength. Preferably the laminate is treated at a temperature higher than the melting point of at least one, and preferably all, of the polymers in each of the compositions. This step can be combined with a high temperature deformation step used to convert the laminate into a heat-recoverable article. Treatment times of up to 10 minutes are generally satisfactory. In another embodiment, the irradiated laminate is heat-treated for an extended time, e.g. at least 12 hours, preferably at least 24 hours, at an elevated temperature which is below the melting point of any polymer which is present in significant amount in either the first or the second polymeric composition, preferably at a temperature of at least 100° C., e.g. 125°–175° C.

EXAMPLES

The invention is illustrated in the following Examples, which are summarized in the Tables below. In each of the Examples, a laminate was made from a first composition A and a second composition B. In Examples 1, 4–19, 36–39, 41, 44 and 45, the laminates were in the form of slabs which were prepared as follows. A slab of the lower modulus material (Composition A) was pressed at 210° C. in a 15×15 cm (6×6 inch), 0.95 or 1.1 mm (37 or 45 mil) frame, using maximum ram force of about 18,000 kg (40,000 lb). A slab of the higher modulus material (composition B) was pressed at 210° C. in a 15×15 cm (6×6 inch) 0.25 mm (10 mil) frame, using maximum ram force of about 18,000 kg (40.000 lb). A 2.5 cm (1 inch) wide foil strip was placed on a marginal portion of the top surface of the thicker slab (to provide a starting point for the subsequent peel test). The thin slab was then placed on top and the two slabs laminated together in a 15×15 cm (6×6 inch) 0.95 or 1.1 mm (37 or 45 mil) frame, at 210° C., the ram pressure being 2,250 kg (5,000 lb) for 1 min., 4,500 kg (10,000 lb) for 1 min., and 9,000 kg (20,000 lb) for 1 min. Pressure was released, and the laminate was removed and placed in a cold water press under a pressure of 11,300 kg (25,000 lb) for 1 minute. In Examples 20 to 35, the same procedure was followed except that Composition A was pressed in a 0.4 mm (15 mil) frame and Composition B was pressed in 0.25 mm (10 mil) frame. In a few of the Examples, as indicated by the notation "(+5MR)" in the Tables, the slabs were irradiated before they were laminated. In Examples 2, 3, 40, 42, and 43, the laminate was in the form of tubing prepared by coextruding a first composition A to form an inner layer of thickness about 0.65 mm (25 mil) and a second composition B to form an outer layer of thickness about 0.13 mm (5 mil). The internal diameter of the tubing about 5.7 mm (0.225 inch).

In each of the Examples, strips 15×0.65 cm (6×0.25 inch) were cut from the laminates. Where indicated in the Tables below, the strips were irradiated and/or annealed. In most cases, annealing was effected immediately after irradiation, but as shown by the peel strengths in Example 2 marked *, measured on samples which were heat-treated after sufficient time had elapsed for free radicals to decay, a delay between irradiation and annealing is not significant. In Examples 40–43, some of the strips were soaked in methylethylketone (MEK) for sufficient time to give the indicated percentage increase in weight, or were exposed to gasoline for the indicated time; bond strengths were measured after the solvent had evaporated for 24 hours. The bond strength between the two layers was then determined on a standard Instron at a peel rate of 5.1 cm (2 inch) per minute. As those skilled in the art will realise, it is difficult to obtain consistent results in the measurement of peel strengths particularly at low peel strengths. In addition, it should be pointed out that the peel strengths of the tubular laminates are not comparable with the peel strengths of the slab laminates.

The various compositions used in the Examples are identified below.

Compositions A

A1: Ionomer
A2: High density polyethylene
A3: EPDM elastomer
A4: Low density polyethylene
A5: Low density polyethylene containing a radiation cross-linking agent A6: Blend of a fluoroelastomer and a thermoplastic elastomer containing stabilizers, flame retardants, and a radiation cross-linking agent
A7: Same as A6, but without the cross-linking agent
A8: Ethylene/vinyl acetate copolymer containing stabilizers, and a radiation cross-linking agent
A9: Ethylene/vinyl acetate copolymer containing stabilizers, flame-retardants and a radiation cross-linking agent
A10: Ethylene/ethyl acrylate copolymer containing stabilizers, flame-retardants and a radiation cross-linking agent
A11: Thermoplastic elastomer containing stabilizers, flame retardants and a radiation cross-linking agent Compositions B B1: Polyvinylidene fluoride containing stabilizers, plasticiser and radiation cross-linking agent
B2: High density polyethylene
B3: Polyvinylidene fluoride
B4: Polyvinylidene fluoride containing a radiation cross-linking agent
B5: A blend of polyvinylidene fluoride and a fluoroelastomer containing a radiation cross-linking agent
B6: High density polyethylene containing a radiation cross-linking agent
B7: Nylon-12
B8: A blend of polyvinylidene fluoride and an acrylic elastomer containing stabilizers and a radiation cross-linking agent
B9: A blend of polyvinylidene fluoride and an ionomer containing stabilisers
B10: Ethylene/vinyl acetate copolymer
B11: Polyvinylidene fluoride containing a radiation cross-linking agent
B12: Nylon 12 containing a radiation cross-linking agent
B13: Ionomer
B14: Ionomer containing a radiation cross-linking agent

TABLE A

| Ex. No. | A | B | Dose | Bond Strength in kg/cm (pli) After Annealing (Mins/°C.) | | | | | |
|---|---|---|---|---|---|---|---|---|---|
| | | | | None | 5/100 | 5/150 | 5/175 | 5/200 | 5/225 | 240/175 |
| 1 | 6 | 1 | 0 | 0.4 (2.1) | — | — | — | — | 0.3 (1.6) | — |
| | | | 5.0 | 0.75 (4.2) | — | — | 1.2 (6.8) | — | 1.25 (6.9) | — |
| | | | 10.0 | 0.91 (5.2) | | | 1.15 (6.5) | | 1.5 (8.4) | |
| 2 | 6 | 1 | 0 | 1.0 (5.6) | — | 0.5 (3.1) | — | — | — | — |
| (Tubing) | | | 5 | 1.3 (7.4) | 0.85 (4.8) | 1.1 (6.4) | 2.25 (12.7) 2.15 (12.0)* | 2.4 (13.5) | 3.4 (19.0) | 3.4 (18.9) |
| | | | 10 | 1.5 (8.2) | 1.25 (7.0) | 1.35 (7.6) | 2.35 (13.2) 2.1 (11.9)* | 2.35 (13.1) | — | — |
| | | | 15 | 1.3 (7.3) | 1.1 (6.1) | 1.3 (7.2) | 2.3 (12.9) 2.1 (12.0)* | 2.45 (13.8) | — | — |
| 3 | 6 | 2 | 0 | 0.45 (2.5) | — | — | — | — | — | — |
| (Tubing) | | | 10 | 0.9 (4.9) | 0.75 (4.1) | 0.95 (5.4) | 1.05 (5.8) | — | — | — |

TABLE B

| Ex. No. | A | B | Dose (MR) | Bond Strength in kg/cm (pli) after annealing | |
|---|---|---|---|---|---|
| | | | | None | 10 min/225° C. |
| 4 | 6 | 3 | 0 | 0.15 (0.9) | — |
| | | | 5 | 0.52 (2.9) | 1.15 (6.4) |
| | | | 10 | 0.4 (2.1) | 1.15 (6.5) |
| 5 | 6 | 4 | 0 | 0.1 (0.6) | — |
| | | | 5 | 0.05 (0.4) | 0.5 (2.7) |
| | | | 10 | 0.55 (3.1) | 1.1 (6.2) |
| 6 | 6 | 1 | 0 | 0.1 (0.5) | — |
| | | | 5 | 0.55 (3.2) | 1.15 (6.5) |
| | | | 10 | 0.25 (1.4) | 0.65 (3.7) |
| 7 | 6 | 5 | 0 | 0.1 (0.6) | — |
| | | | 5 | 0.05 (0.4) | 0.2 (1.1) |
| | | | 10 | 0.75 (4.1) | 0.3 (1.7) |
| 8 | 6 | 2 | 0 | 0.2 (1.0) | — |
| | | | 5 | 2.3 (12.8) | 3.35 (18.7) |
| | | | 10 | 1.95 (10.9) | 2.85 (15.9) |
| 9 | 6 | 6 | 0 | 0.1 (0.7) | — |
| | | | 5 | 1.65 (9.3) | 3.0 (16.9) |
| | | | 10 | 1.15 (6.5) | 2.0 (11.1) |
| 10 | 7 | 3 | 0 | 0 | — |
| | | | 5 | 0.05 (0.2) | 0.1 (0.5) |
| 11 | 8 | 1 | 0 | 0 | — |
| | | | 5 | 0.2 (1.0) | 0.35 (2.0) |
| | | | 10 | 0.15 (0.8) | 0.3 (1.8) |
| 12 | 9 | 1 | 0 | 0 | — |
| | | | 10 | 0.15 (0.8) | 0.3 (1.6) |
| 13 | 10 | 1 | 0 | 0 | — |
| | | | 10 | 0.15 (0.8) | 0.75 (4.2) |
| 14 | 10 | 8 | 0 | 0 | — |
| | | | 5 | 0.9 (4.9) | 0.85 (4.7) |
| 15 | 10 | 9 | 0 | 0.02 (0.1) | — |
| | | | 5 | 0.35 (2.1) | 0.75 (4.1) |
| 16 | 1 | 1 | 0 | 0 | — |
| | | | 5 | 0.04 (0.2) | 0.15 (1.0) |
| | | | 10 | 0 | 0.15 (0.8) |
| 17 | 1 | 2 | 0 | 0.04 (0.2) | — |

TABLE B-continued

| Ex. No. | A | B | Dose (MR) | Bond Strength in kg/cm (pli) after annealing | |
|---|---|---|---|---|---|
| | | | | None | 10 min/225° C. |
| | | | 5 | 0.09 (0.5) | 0.4 (2.2) |
| 18 | 1 | 7 | 0 | 0 | — |
| | | | 5 | 0 | 0.45 (2.5) |
| 19 | 3 | 1 | 0 | 0 | — |
| | | | 5 | 0.3 (1.7) | 0.95 (5.4) |
| | | | 10 | 0.7 (3.9) | 1.05 (6.0) |
| 20 | 4 | 3 | 0 | 0 | — |
| | | | 5 | 0 | 0 |
| 21 | 5 | 3 | 0 | 0 | — |
| | | | 5 | 0 | 0 |
| 22 | 4 | 1 | 0 | 0 | — |
| | | | 5 | 0 | 0 |
| 23 | 5 | 1 | 0 | 0 | — |
| | | | 5 | 0 | 0 |
| 24 | 4 | 11 | 0 | 0.7 (4.0) | — |
| | | | 5 | 0.9 (5.1) | >2.5 (14) |
| 25 | 5 | 11 | 0 | 0.55 (3.0) | — |
| | | | 5 | 1.35 (7.6) | 1.35 (7.6) |
| 26 | 4 | 7 | 0 | 0 | — |
| | | | 5 | 0 | 0 |
| 27 | 4 | 12 | 0 | 0 | — |
| | | | 5 | 0 | 0 |
| 28 | 5 | 7 | 0 | 0 | — |
| | | | 5 | 0.1 (0.6) | 0.25 (1.5) |
| 29 | 5 | 12 | 0 | 0 | — |
| | | | 5 | 0.05 (0.4) | 0.2 (1.1) |
| 30 | 4 | 13 | 0 | 0 | — |
| | | | 5 | 0.03 (0.2) | 0.07 (0.4) |
| 31 | 4 | 14 | 0 | 0.1 (0.6) | — |
| | | | 5 | 1.95 (11.0) | 2.05 (11.4) |
| 32 | 5 | 13 | 0 | 0 | — |
| | | | 5 | 0.35 (1.9) | 0.5 (2.9) |
| 33 | 5 | 14 | 0 | 0.1 (0.5) | — |
| | | | 5 | 0.6 (3.4) | 1.25 (6.9) |
| 34 | 4 (+10 MR) | 13 (+10 MR) | 0 | 0.3 (1.7) | — |
| 35 | 5 (+10 MR) | 14 (+10 MR) | 0 | 1.6 (9.1) | — |
| 36 | 6 | 1 | 0 | 0.65 (3.6) | 0.4 (2.2) |
| | | | 5 | 1.15 (6.5) | 1.3 (7.4) |
| 37 | 6 (+5 MR) | 1 | 0 | 0.65 (3.7) | 0.3 (1.6) |
| | | | 5 | 0.8 (4.4) | 0.8 (4.5) |
| 38 | 6 | 1 (+5 MR) | 0 | 1.5 (8.5) | 0.9 (5.1) |
| | | | 5 | 1.7 (9.4) | 1.7 (9.7) |
| 39 | 6 (+5 MR) | 1 (+5 MR) | 0 | 1.55 (8.7) | 1.0 (5.7) |
| | | | 5 | 1.7 (9.5) | 1.7 (9.4) |

TABLE C

| Ex. No. | A | B | Dose (MR) | Bond Strength in kg/cm (pli) after annealing | |
|---|---|---|---|---|---|
| | | | | None | 10 min/225° C. and solvent exposure |
| 40 (Tubing) | 6 | 1 | 0 | 1.0 (5.6) | 0 (33% MEK) |
| | | | 5 | 1.3 (7.4) | 0.9 (4.9) (41% MEK) |
| | | | 5 | — | 1.6 (8.9) (45% MEK) |
| | | | | 3.4 (19) | |
| 41 | 6 (+5 MR) | 1 (+5 MR) | 0 | 0.75 (4.2) | 0 (40% MEK) |
| 42 (Tubing) | 6 | 1 | 5 | 1.3 (7.4) | 0.4 (2.3) (24 hrs. to gasoline) |
| | | | | | 0.25 (1.4) (72 hrs. to gasoline) |
| | | | | | 0.35 (2.0) (7 days to gasoline) |
| 43 (Tubing) | 6 | 1 | 5 | — | 1.2 (6.8) (24 hrs. to gasoline) |
| | | | | 2.4 (13.5) | 1.3 (7.4) (24 hrs. to gasoline) |
| | | | | | 1.25 (7.0) (7 days to gasoline) |
| 44 | 11 | 1 | 0 | 0.1 (0.5) | 0.1 (0.5) |
| | | | | 0.2 (1.1) | 0.6 (3.5) |
| | | | | 1 day/150° C. | 3 days/150° C. | 5 days/150° C. |
| 45 | 6 | 1 | 5 | 0.2 (1.2) | 0.75 (4.2) | 1.05 (5.9) | 1.4 (7.8) |

We claim:

1. A method of preparing a laminate comprising a first layer composed of a first polymeric composition and an adherent second layer composed of a second polymeric composition, which method comprises (1) preparing a laminate comprising a layer of a first radiation cross-linkable polymeric composition and an adjacent layer of a second radiation cross-linkable polymeric composition which is incompatible with the first composition, the laminate being prepared by a process in which the interface between the layers is heated to a temperature which is higher than the melting point of at least one of the polymers in at least one of the compositions; and (2) irradiating the laminate prepared in step (1) to effect cross-linking of said first and second compositions.

2. A method according to claim 1 which comprises deforming the irradiated laminate at a temperature which is higher than the melting point of at least one of the polymers in at least one of the compositions, and cooling the deformed laminate, thereby preparing a heat-recoverable article.

3. A method according to claim 1 wherein at least one of the polymeric compositions contains a radiation cross-linking agent.

4. A method according to claim 1 wherein in step (1), the interface is heated to a temperature which is higher than the melting point of at least one of the polymers in each of the compositions.

5. A method according to claim 1 which comprises (3) heat-treating the irradiated laminate at a temperature which is higher than the melting point of at least one of the polymers in at least one of the compositions.

6. A method according to claim 5 wherein in step (3), the laminate is heat-treated at a temperature which is higher than the melting point of at least one of the polymers in each of the compositions.

7. A method according to claim 5 wherein the product of step (3) has a peel strength which is at least twice the peel strength of the product of step (1).

8. A method according to claim 1 wherein the first composition comprises at least one polymer which is selected from fluoropolymers, polyolefins and polyamides.

9. A method according to claim 8 wherein the first composition also contains an elastomer.

10. A method according to claim 8 wherein the first composition comprises polyvinylidene fluoride.

11. A method according to claim 1 wherein the first composition comprises an elastomer.

12. A method according to claim 11 wherein the second composition comprises an elastomer.

13. A method according to claim 1 wherein each of the layers is electrically insulating.

14. A laminate prepared by the method of claim 1.

15. A heat-recoverable laminate prepared by the method of claim 2.

16. A process for providing an electrically insulating covering over a substrate which comprises surrounding the substrate with an electrically insulating, heat-shrinkable laminate prepared by the method of claim 2, and heating the laminate to cause it to shrink into contact with the substrate.

* * * * *